Patented Nov. 14, 1922.

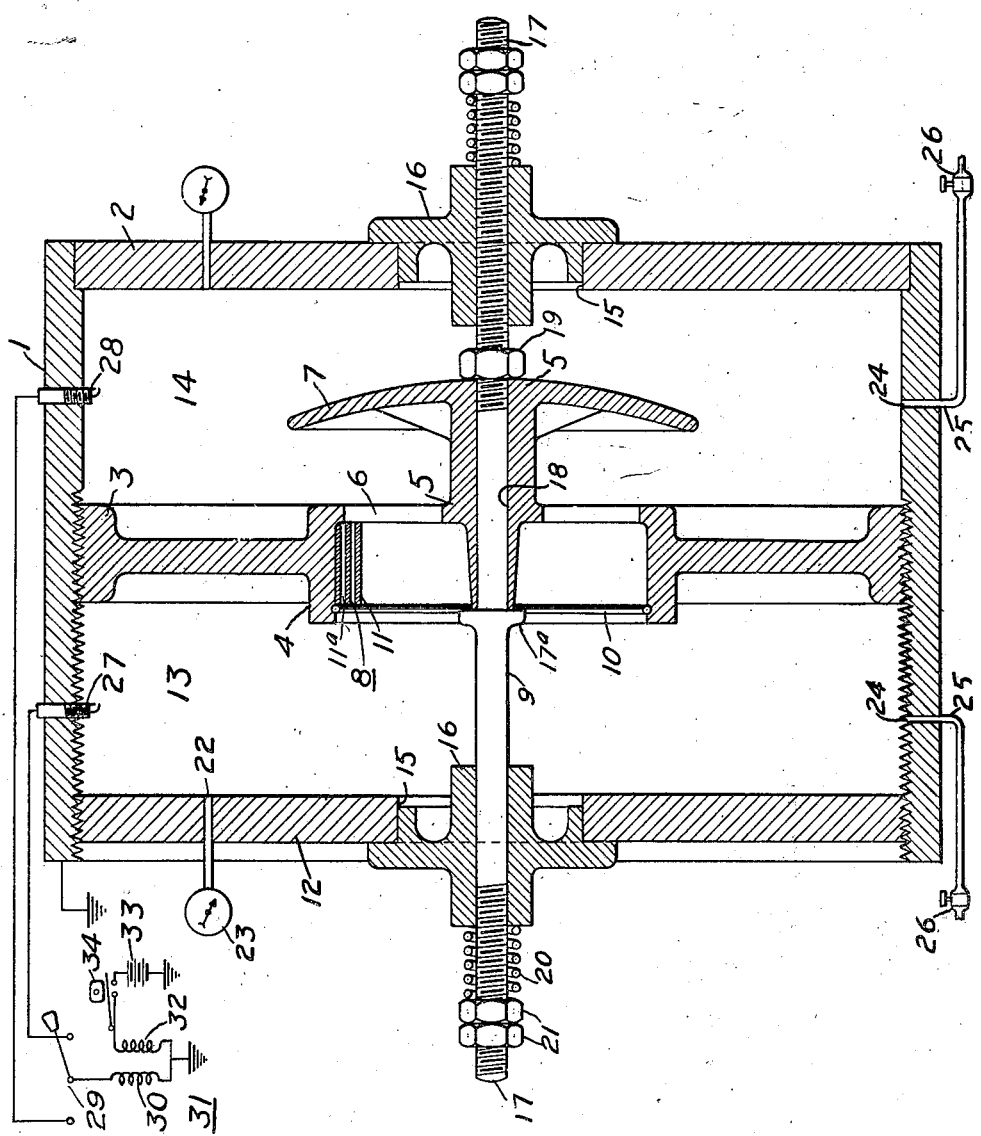

1,435,264

UNITED STATES PATENT OFFICE.

CHARLES W. STARKER, OF PITTSBURGH, PENNSYLVANIA, ASSIGNOR TO WESTINGHOUSE ELECTRIC AND MANUFACTURING COMPANY, A CORPORATION OF PENNSYLVANIA.

TESTING APPARATUS FOR EXPLOSION-PROOF DEVICES.

Application filed January 26, 1917. Serial No. 144,671.

*To all whom it may concern:*

Be it known that I, CHARLES W. STARKER, a subject of the Emperor of Germany, and a resident of Pittsburgh, in the county of Allegheny and State of Pennsylvania, have invented a new and useful Improvement in Testing Apparatus for Explosion-Proof Devices, of which the following is a specification.

My invention relates to testing apparatus for explosion-proof devices such as are used in connection with electrical apparatus, and it has for its object to provide a testing apparatus by means of which the effectiveness of such devices may be readily ascertained before using them in actual service.

In my copending application, Serial No. 117,778, filed August 30, 1916, I have shown and described an explosion-proof device that is adapted to be applied to the enclosing casings of electrical apparatus which is operated in coal mines, tunnels, submarine boats, or in similar locations where readily inflammable mixtures of explosive gases are present. The device is so constructed that, when an explosion occurs within the enclosing casing, the excessive pressure resulting therefrom is relieved without the emission of burning gases from the casing into the surrounding atmosphere.

According to the present invention, I provide a testing apparatus whereby explosion-proof devices of the above-described type may be subjected to conditions closely approaching those encountered in actual service, so that the durability and effectiveness of such devices may be determined before placing them on electrical apparatus.

The single figure of the accompanying drawings is a transverse sectional view of a testing apparatus embodying my invention.

The testing apparatus comprises a hollow cylindrical portion 1, preferably composed of steel of high tensile strength, and an end plate 2 that is joined to the cylinder 1 by welding or other similar means, so that a perfectly gas-tight joint is formed therebetween, or the end plate 2 may be formed integral with the cylinder 1. The cylinder 1 is internally threaded to receive an externally threaded plate 3 that is provided with an annular flange 4, within which a hub 5 is centrally supported by spaced radial ribs 6. The hub 5 projects beyond the face of the plate 3 and terminates in a curved shield 7. A coil 8 is located within the flange 4 and is secured upon a reduced portion 9 of the hub 5 by means of a retaining ring 10. The coil 8 is preferably formed of a number of convolutions 11 of strap material that are spaced apart by suitable means to provide passages 11ᵃ therebetween. The parts of the plate 6 and the coil 8 are shown as being substantially the same in form as the corresponding parts of the explosion-proof device described in my above mentioned copending application, but it is to be understood that the plate 6 may as well be adapted to receive other similar devices.

The plate 3 is normally located between the fixed end plate 2 and an externally threaded end plate 12, thereby providing enclosed and substantially air-tight chambers 13 and 14 at the respective sides of the plate 3. The end plates 2 and 12 are respectively provided with centrally located openings 15—15 within which are seated valves 16. The valves 16 are mounted on a rod 17 which extends through the chambers 13 and 14 and through an opening 18 provided in the hub 5 of the plate 3. The rod 17 is maintained in fixed relation to the plate by means of a collar 17ᵃ and a lock-nut 19, coacting with a threaded portion of the rod and the outer face of the shield 7. The valves 16 are held in the openings 15 by means of springs 20 and nuts 21 coacting with the rod 17. The end plates 2 and 12 are further provided with openings 22 within which are located the stems of suitable pressure gauges or indicators 23. The wall of the cylinder 1 is provided with openings 24 at points at the respective sides of the plate 3, within which are located the ends of pipes 25 that are connected to a suitable gas supply through control valves 26. The chambers 13 and 14 are provided with ignition devices, such as spark plugs 27 and 28, that are located in the wall of the cylinder 1 and are connected to the stationary contact members of a single-pole, double-throw switch 29. The movable contact member of the switch is connected to one terminal of the secondary winding 30 of an induction coil 31. One terminal of the primary winding 32 is connected to a source of electromotive force 33 through a suitable interrupter 34 of the cam type. The other terminals of the windings 30 and 32, the source 33 and the cylinder 1 are all connected to ground, as is customary in similar ignition systems.

Having fully described the various parts entering into my invention, the operation thereof is as follows. The plates 3 and 12 are so positioned within the cylinder 1 that the cubic capacity of the chamber 13 corresponds to the cubic capacity of the enclosing casing of a piece of electrial apparatus, for each unit of the explosion-proof device with which it is to be provided. The valves 16 are then set for the maximum pressure that is to be permitted within the enclosing casing. The chambers 13 and 14 are then filled with an explosive gaseous mixture, the composition of which closely approximates the composition of the most inflammable mixture that is liable to be encountered in the service in which the device to be tested is to be used. The charge within the chamber 13 is exploded by the spark plug 27 when the switch 29 is thrown to its right-hand position and, if the device under test is effective, the pressure in the chamber 13, following the explosion, will be relieved more or less gradually, as indicated by the gauges 23. The switch 29 is then thrown to its left-hand position to cause discharge from the plug 28 in order to ascertain whether the charge in the chamber 14 is still of an explosive nature and has not been ignited by the escaping gases. In case the device under test is defective and allows the passage of burning gases into the chamber 14, the sudden increase in pressure following a second explosion in the chamber 14 will be relieved by the opening of the valve 16. Furthermore, if the action of the device under test does not allow a sufficient reduction of the pressure in the chamber 13, the opening of the other valve 16 will prevent destruction of the apparatus, as a whole.

From the foregoing, it is apparent that explosion-proof devices may be subjected to a most rigorous test under conditions closely approaching those encountered in actual service and, while I have shown my invention in a simple and preferred form, it is not so limited but is susceptible of various modifications within the scope of the appended claims.

I claim as my invention:

1. A testing apparatus for explosion-proof devices comprising two chambers adapted to be filled with an explosive gaseous mixture and a partition separating said chambers for holding the device to be tested and means disposed within one of said chambers for causing an explosion therein.

2. A testing apparatus for explosion-proof devices comprising a plurality of communicating chambers adapted to be filled with an explosive gaseous mixture, means disposed within one of said chambers for causing an explosion therein thereby effecting equal internal pressure in each of said chambers, and means for supporting a device to be tested in the path of the products of combustion passing from one of said chambers to the other.

3. A testing apparatus for explosion-proof devices comprising two chambers adapted to be filled with an explosive gaseous mixture, a partition separating said chambers and provided with an opening within which is located the device to be tested and means disposed within one of said chambers for causing an explosion therein.

4. A testing apparatus for explosion-proof devices comprising two chambers adapted to be charged with an explosive gaseous mixture, a partition separating said chambers and provided with an opening within which is located the device to be tested and means disposed within one of said chambers for igniting the charge in one of said cylinders.

5. A testing apparatus for explosion-proof devices comprising two chambers adapted to be charged with an explosive gaseous mixture, a partition separating said chambers and provided with an opening within which is located the device to be tested and means for successively and independently igniting the charges in said chambers.

6. A testing apparatus for explosion-proof devices comprising two chambers adapted to be filled with an explosive gaseous mixture, a partition separating said chambers and provided with an opening within which is located the device to be tested and an ignition device located in one of said chambers.

7. A testing apparatus for explosion-proof devices comprising two chambers adapted to be filled with an explosive gaseous mixture, a partition separating said chambers and provided with an opening within which is located the device to be tested, ignition devices located in said chambers and means for successively operating said devices.

8. A testing apparatus comprising two substantially gas-tight chambers separated by a partition adapted to support a device to be tested, the said partition being adjustable for varying the cubic capacities of said chambers.

9. A testing apparatus comprising a hollow cylinder provided with end closures, and a partition with threaded engagement with said cylinder for dividing it into chambers, the said partition being adjustable with respect to said end closures for varying the cubic capacities of said chambers.

In testimony whereof, I have hereunto subscribed my name this 19th day of January, 1917.

CHARLES W. STARKER.